Nov. 7, 1950
M. ROSE ET AL
2,529,265
DEVICE FOR INDEXING CONTACT SPRINGS
IN CONTACT-WELDING APPARATUS
Filed Jan. 18, 1947
2 Sheets-Sheet 1
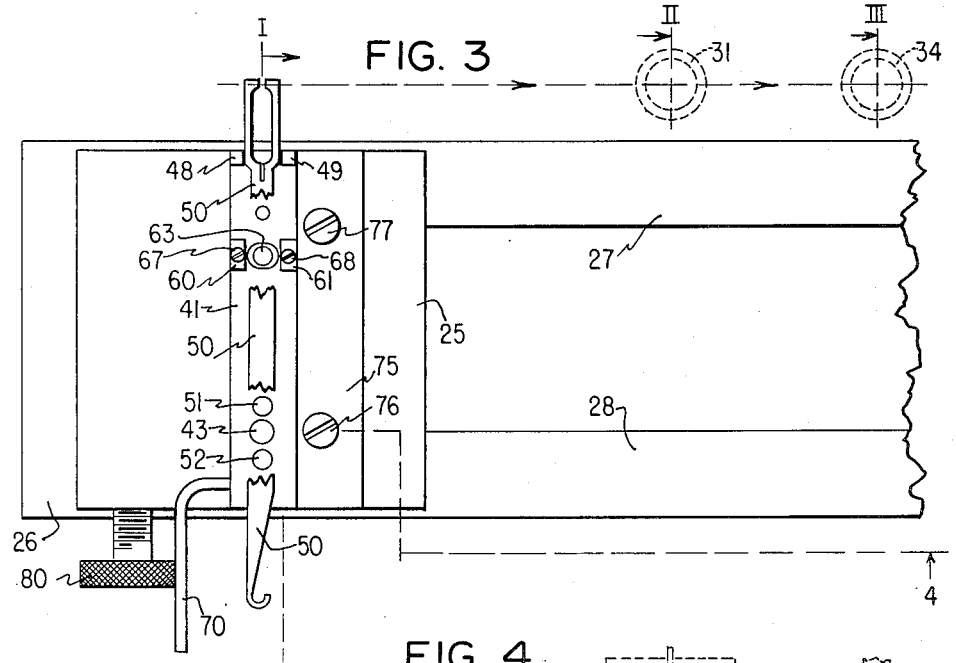
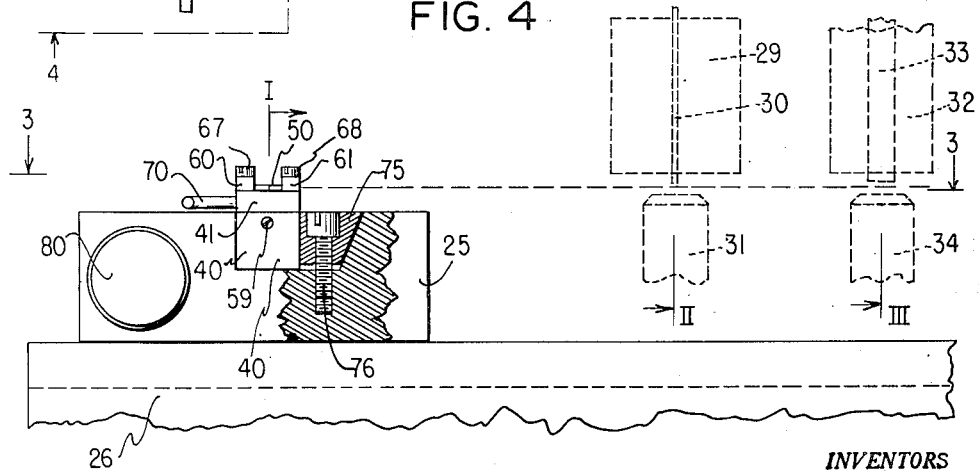
INVENTORS
Jerry John Zak
Morris Rose
BY
*C. P. Soper*
Atty.

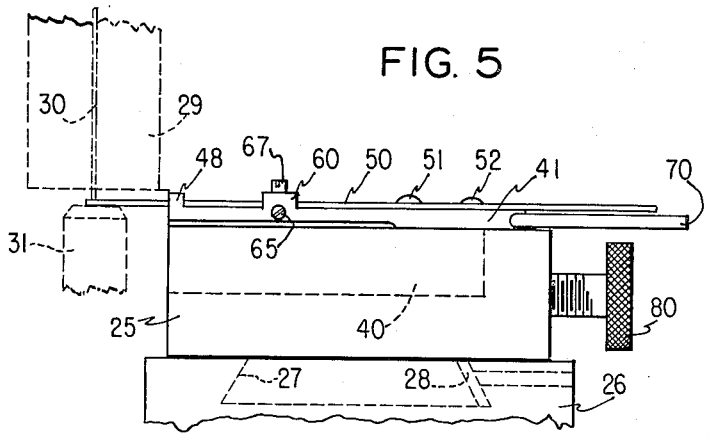
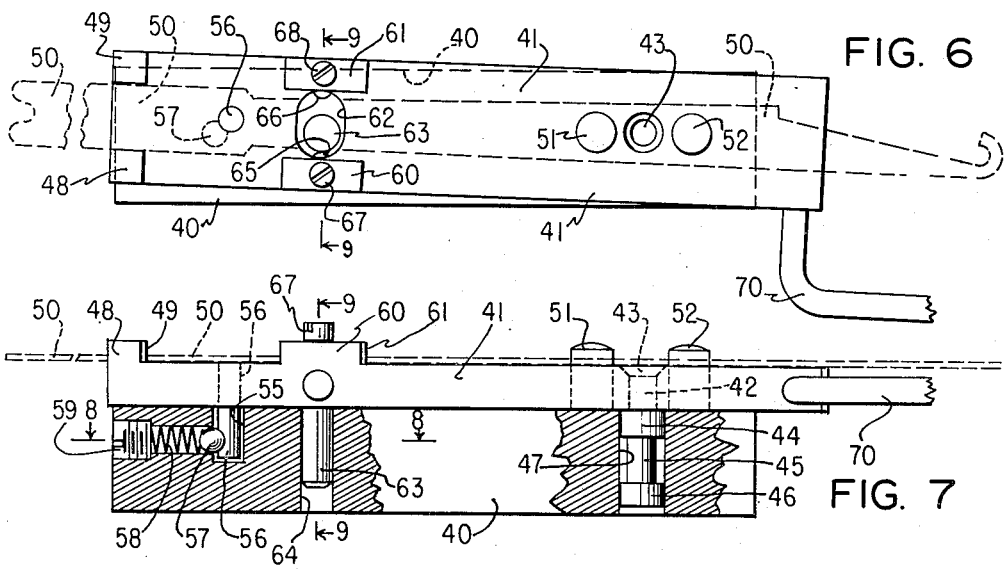
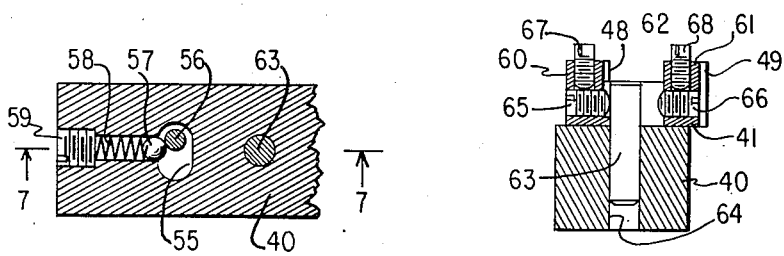

Patented Nov. 7, 1950

2,529,265

UNITED STATES PATENT OFFICE 2,529,265

DEVICE FOR INDEXING CONTACT SPRINGS IN CONTACT-WELDING APPARATUS

Morris Rose, Chicago, and Jerry John Zak, Lombard, Ill., assignors to Kellogg Switchboard and Supply Company, Chicago, Ill., a corporation of Illinois Application January 18, 1947, Serial No. 722,830

13 Claims. (Cl. 113—99)

This invention is concerned with a device for indexing contact springs in contact-welding apparatus for the purpose of selectively positioning the contact-receiving portion of a spring with respect to the welding means in such a manner that a plurality of contact points can be successively welded thereto.

It is deemed advisable to refer first briefly to the prior practice of welding contact points on certain types of contact springs so as to support the understanding of the detailed description of the invention which is yet to follow.

Contact springs employed in relays, e. g., relays used in telephone switching equipment, require contact points consisting of platinum or other suitable contact metal. The contact metal is applied to the contact-receiving portion of a spring blank by welding and is then shaped by swaging to form a point-like projection for contact-making engagement with a contact surface carried on an associated contact spring. The welding of a contact point to a contact spring and the shaping thereof may be accomplished in machines, examples of which are shown in U. S. Patents Nos. 1,090,618, 1,090,619, 1,292,892, and 1,309,523.

The known contact-welding and shaping machines are adapted to receive a contact spring blank in engagement with a reciprocable carriage which moves the spring blank automatically to position its contact-receiving portion in alignment with the contact-welding means. The spring blank is in this position automatically contacted by the end of a wire or rod of suitable contact metal which is welded thereto and then cut off, leaving a piece of contact metal attached to it. The carriage then moves the spring blank automatically to another position in which a plunger is operated to swage the piece of contact metal welded to it so as to form the desired contact point shape. The carriage thereupon returns automatically to the initial normal position in which the contact spring with the contact point thereon is removed. Another spring blank is then manually placed on the carriage, and the cycle of operations is repeated.

The above described sequence of operations applies in the manufacture of contact springs having a single contact point.

In the case of contact springs having two contact points, the sequence of operations is applied for each contact point separately. This requires setting-up of the machine for the welding and shaping of the first contact point to be applied to the spring blanks, and thereafter again setting up the machine for the welding and shaping of the second contact point.

The old procedure is time-consuming and introduces delays which are annoyingly felt in mass production, increasing the cost of the unit product.

The object of the invention is to provide an indexing device for selectively adjusting the position of the contact-receiving portion of a contact spring blank in such a manner that two contact points can be applied successively without any intervening setting-up operation, thus eliminating delays, increasing production, and thereby lowering the cost of the unit product.

This and other objects and features appear from the detailed description which is rendered below with reference to the accompanying drawings. In these drawings, Figs. 1 and 2 show examples of contact springs each carrying a pair of contact points;

Fig. 3 shows a diagrammatic elevational top view of the new index device in its position on the reciprocable carriage of an automatic welding and contact-shaping machine, as seen when looking in the direction of the arrows along lines 3—3 of Fig. 4;

Fig. 4 illustrates a side view of the organization of elements as seen when looking in the direction of the arrows along lines 4—4 in Fig. 3, certain parts of the carriage being shown in section to indicate the manner in which the new device is mounted thereon;

Fig. 5 represents an end view of the elements, Figs. 3 and 4, as seen from the left thereof;

Fig. 6 illustrates, on an enlarged scale, an elevational top view of the new indexing device;

Fig. 7 is a side view of the new device partly in elevation and partly in longitudinal section along the median center lines 7—7 indicated in Fig. 8;

Fig. 8 represents a sectional view looking along the lines 8—8 of Fig. 7; and

Fig. 9 shows a sectional view along lines 9—9 of Fig. 7.

Like parts are numbered alike throughout the drawings. Known details and elements will be discussed only to the extent required for conveying an understanding of the invention.

The examples of contact springs shown in Figs. 1 and 2 are well known. They are included for the sake of completeness, to identify their class, and to facilitate the description of the invention. Each contact spring comprises a body portion 11 and 12, respectively, provided with holes 13 and 14, respectively, soldering tabs 15 and 16, respectively, and forward portions which carry the contacts. In the case of the spring, Fig. 1, the forward portion is indicated at 17 and the contact points at 18 and 19. In the case of the spring, Fig. 2, there are two tongue-like extensions 20 and 21 carrying the contact points 22 and 23, respectively. The holes 13 and 14, respectively, serve the purpose of mounting the corresponding contact springs on relays in coaction with other contact springs.

The contact points 18—19 or 22—23, respectively, on the springs, Figs. 1 and 2, are at the present time applied in separate operations in the manner intimated before.

The indexing device made in accordance with the invention enables the operator to apply the two contact points to each spring blank in succession, thus eliminating in effect three operations, namely, (1) the removal of each spring from its support on the carriage after the first contact point has been applied thereto, (2) the resetting or readjustment of the support or of the travel of the carriage, and (3) the manual replacing of the spring (provided with one contact point) on the support for receiving its second contact point.

The new device, shown in Figs. 3-5 in association with the carriage 25 and on an enlarged scale separately in Figs. 6-9, inclusive, comprises a support or base 40 and a coacting guide or indexing member 41. The latter is pivotally supported on the base by means of a pin having an extension 42 (see Figs. 6 and 7) which is peened over as indicated at 43, thus forming with the shoulder 44 a part of the guide or index member 41. From the shoulder 44 extends the shank 45 terminating in the enlargement 46. The shoulder 44, the shank 45 and the enlargement 46 extend into a boring 47 provided in the base 40, thus forming a journal for the index member 41.

The index member 41 is provided at its forward end with two projections 48—49 between which is positioned the forward end of a spring blank 50 manually placed thereon preparatory to receiving its contact points. The holes 13 or 14, respectively, of the corresponding spring blank (Figs. 1 and 2) are engaged by posts 51 or 52, respectively, which are fastened by press-fit in the guide or index member 41 and extend therefrom as shown in Figs. 6 and 7. The spring blank 50 is thus fixed on the index member 41 longitudinally thereof and its forward end lies between the guide projections 48—49, as shown.

In the base 40, near its forward end, is provided a transversely extending cutout 55, and into this cutout extends a pin 56 which is fastened in the guide or index member 41 by press-fit. Accordingly, angular displacement of the index member 41 on the base 40 displaces the pin 56 within the transverse cutout 55 in an angular motion with respect to the ball 57 which is resiliently pressed inwardly by a spring 58 held in a suitable boring by the set screw 59.

Longitudinally spaced from the projections 48—49 at the forward end of the index member 41 are two extensions 60—61. The material of the index member 41 between these extensions 60—61 is milled out to form the transverse cutout 62. Into this cutout extends a pin 63 projecting upwardly from the base 40. The lower part of the pin 63 is disposed within a boring 64 in the base and is in press-fit therewith. The extension 60 carries a transversely disposed setting or adjusting screw 65 and the extension 61 is provided with a similar setting or adjusting screw 66. Set screws 67—68, respectively, are provided for the purpose of fixing the adjusting screws 65—66 in any adjusted transverse position.

The guide or index member 41 is provided near its rearward end with a handle 70 by means of which it may be angularly displaced around its pivot point 43 in one or the other angular direction. The adjusting screws 65—66 are set so as to limit the angular displacement in either direction by engagement with the post 63 extending upwardly from the base 40 into the transverse cutout 62. The post or pin 56 depending downwardly from the guide or control member 41 into the transverse cutout 55 in the base is thus displaced with respect to the spring-biased ball 57, which holds the post 56 and therewith the spring-positioning or indexing member 41, in either terminal position angularly with respect to the base 40.

The new device is secured on a reciprocable carriage such as the carriage 25 of the automatic welding and contact point-shaping machine, as indicated in Figs. 3, 4 and 5. The base 40 is placed in a transverse cutout in the carriage 25 and fixed therein by means of a wedge-shaped transverse member 75, the attachment being made by suitable means, for example, screws such as 76—77. The carriage may be made in the form of a cross-slide and provided with an adjusting screw 80 to effect fine adjustment of the position of the device, and therewith of the spring blank 50 placed thereon, transversely of the ways 27—28, thus determining the position of the free end of the spring blank, that is, of its contact-receiving portion, in alignment with the contact-welding and contact-swaging positions II and III.

The setting-up operation is completed after securing the index device on the reciprocable carriage 25, placing the first spring blank thereon, and transversely adjusting it by means of the screw 80. The indexing member 41 is moved by means of the handle 70 into its first angular position, which may be the position indicated in Fig. 6. The automatic contact-welding and contact-swaging operations can now begin.

The operator starts the machine, e. g., by a foot treadle, and the carriage 25 with the indexing device and the spring blank thereon is automatically moved from position I in Figs. 3 and 4 to position II, in which position a piece of contact metal is automatically welded to one leg or side of the spring blank as determined by the angular position of the index member 41 with respect to the base 40. After welding, the contact metal is cut off and the carriage 25 is automatically moved to position III in which the contact point is swaged by the operation of the plunger 33 shown in Fig. 4. This completes the welding and shaping of one contact point on the spring blank. The carriage is then automatically returned to the initial or normal position I. During or near the end of the return stroke, the operator flips the handle 70 to move the spring guide or indexing member 41 on its pivot 43 into its alternate angular position, thereby adjusting the position of the contact-receiving portion of the spring blank for the welding of its second contact point. The cycle of automatic operations is repeated, moving the carriage 25 and therewith the adjusted spring blank from position I to position II for welding and cutting of the contact metal, and then to position III for swaging or shaping the second contact point. The reciprocable carriage 25 then returns again automatically into its initial normal position I. Incident to the return motion, after both of the contact points have been applied to the free end of the spring blank, the finished spring is removed, for example, by an air blast, and the operator places another spring on the device. The operations are repeated for any number of spring blanks that may be supplied to the operator. No intervening setting-up operations are required and no time is lost.

Changes may be made within the scope and spirit of the appended claims.

We claim:

1. A device for indexing contact spring blanks, in a contact-welding machine, to dispose the contact-receiving portion thereof selectively in a plurality of predetermined positions relative to the contact-welding means of such machine, said device comprising a generally rectangularly shaped elongated indexing element for receiving and holding a contact spring blank in predetermined position, a base for said indexing element, means for pivotally mounting said indexing element on said base, and adjusting means for adjusting said element on said base in a plurality of predetermined positions relative thereto for the purpose of selectively changing the position of the spring blank thereon, said adjusting means comprising a pinlike member extending from said indexing element downwardly into a cutout formed in said base, a stop member extending from said base upwardly into a cutout formed in said indexing element, and adjustable to stop means for engagement with said stop member.

2. The structure and combination defined in claim 1, together with means in said base for resiliently engaging said pinlike member extending downwardly from said indexing element to hold said element resiliently in either extreme position of angular adjustment.

3. A device for indexing contact spring blanks, in a contact-welding machine, to dispose the contact-receiving portion thereof selectively in a plurality of predetermined positions relative to the contact-welding means of such machine, said device comprising an elongated cross-sectionally generally rectangular member forming an indexing element for receiving and holding a spring blank in predetermined position, a base for said indexing element, guide means on said member substantially at one end thereof forming lateral guides for a spring blank placed thereon, locating means disposed on said member substantially near the opposite end thereof for positioning the spring blank placed thereon, means for pivotally mounting said indexing element on said base for angular displacement thereon including a pivot member extending therefrom in journal engagement with said base, and means disposed between said guide means and said locating means for adjusting the extent of angular displacement of said indexing member relative to said base.

4. A device for indexing contact spring blanks, in a contact-welding machine, to dispose the contact-receiving portion thereof selectively in a plurality of predetermined positions relative to the contact-welding means of such machine, said device comprising an elongated cross-sectionally generally rectangular member forming an indexing element for receiving and holding a spring blank in predetermined position, a base for said indexing element, guide means on said member substantially at one end thereof forming lateral guides for a spring blank placed thereon, locating means disposed on said member substantially near the opposite end thereof for positioning the spring blank placed thereon, means for pivotally mounting said indexing element on said base for angular displacement thereon including a pivot member extending therefrom in journal engagement with said base, means disposed between said guide means and said locating means for adjusting the extent of angular displacement of said indexing member relative to said base, and means in said base coacting with said indexing element for resiliently holding said element in either extreme angular position of adjustment thereof.

5. A device for indexing contact spring blanks, in a contact-welding machine, to dispose the contact-receiving portion thereof selectively in a plurality of predetermined positions relative to the contact-welding means of such machine, said device comprising an elongated cross-sectionally generally rectangular member forming an indexing element for receiving and holding a spring blank in predetermined position, a base for said indexing element, guide means on said member substantially at one end thereof forming lateral guides for a spring blank placed thereon, locating means disposed on said member substantially near the opposite end thereof for positioning the spring blank placed thereon, means for pivotally mounting said indexing element on said base for angular displacement thereon including a pivot member extending therefrom in journal engagement with said base, means disposed between said guide means and said locating means for adjusting the extent of angular displacement of said indexing member relative to said base, a holding member extending from said indexing element into said base, and means in said base coacting with said holding member for resiliently holding it and therewith said indexing member in either extreme position of angular adjustment.

6. In combination, an elongated cross-sectionally substantially rectangular base, means forming a cross-sectionally substantially rectangular indexing element, means for pivotally mounting said element for angular displacement on said base, a cutout in said element, a stop member extending from said base into said cutout, and guide means on said element for disposing thereon a member to be indexed.

7. The structure and combination defined in claim 6, together with limit members coacting with said stop member to limit the angular displacement of said indexing element.

8. The structure and combination defined in claim 6, together with limit members coacting with said stop member to limit the angular displacement of said indexing element, and means for adjusting the position of said limit members.

9. The structure and combination defined in claim 6, together with limit members coacting with said stop member to limit the angular displacement of said indexing element, means for adjusting the position of said limit members, and means for securing said limit members in adjusted position.

10. The structure and combination defined in claim 6, together with limit members coacting with said stop member to limit the angular displacement of said indexing element, means for adjusting said limit members, a cutout formed in said base, means forming an extension projecting from said indexing member into the cutout in the base, and a spring-biased positioning ball in said base projecting into the cutout therein into engagement with said extension to hold such extension in off-center position thereby securing the indexing element in its extreme angular positions on said base.

11. For use in a contact-welding machine of the class described, an indexing device for receiving a spring blank and for selectively positioning the contact-receiving portion of such spring blank relative to the contact-welding means of said machine for the purpose of successively welding a plurality of contact points thereon without intervening removal of said spring blank, said indexing device comprising a base, an indexing element for receiving and for holding a spring blank, means for pivotally securing said indexing element on said base for angular displacement in two extreme angular positions relative thereto, adjusting means for adjusting the extent of angular displacement of said indexing element on said base, said adjusting means comprising a stop member anchored in said base and extending therefrom into a cutout formed in said indexing element, adjustable limit members carried by said indexing element for coaction with said stop member, and means for resiliently securing said indexing element in each extreme position of angular displacement.

12. For use in a contact-welding machine of the class described, an indexing device for receiving a spring blank and for selectively positioning the contact-receiving portion of such spring blank relative to the contact-welding means of said machine for the purpose of successively welding a plurality of contact points thereon without intervening removal of said spring blank, said indexing device comprising a base, an indexing element for receiving and for holding a spring blank, means for pivotally securing said indexing element on said base for angular displacement in two extreme angular positions relative thereto, means for adjusting the extent of angular displacement on said indexing element, and means for resiliently securing said indexing element in each extreme position of angular displacement comprising a holding member anchored in said indexing element and extending into a cutout in said base, and a spring-biased ball in said base coacting with said holding member for securing it in its off-center positions thereby securing the indexing element in its corresponding extreme positions of angular displacement.

13. For use in a contact-welding machine of the class described, an indexing device for receiving a spring blank and for selectively positioning the contact-receiving portion of such spring blank relative to the contact-welding means of said machine for the purpose of successively welding a plurality of contact points thereon without intervening removal of said spring blank, said indexing device comprising a base, an indexing element for receiving and for holding a spring blank, means for pivotally securing said indexing element on said base for angular displacement in two extreme angular positions relative thereto, means for adjusting the extent of angular displacement of said indexing element comprising a stop member anchored in said base and extending therefrom into a cutout formed in said indexing element, adjustable limit members carried by said indexing element for coaction with said stop member, and means for resiliently securing said indexing element in each extreme position of angular displacement comprising a holding member anchored in said indexing element and extending into a cutout in said base, and a spring-biased ball in said base coacting with said holding member for securing it in its off-center positions thereby securing the indexing element in its corresponding extreme positions of angular displacement.

MORRIS ROSE.
JERRY JOHN ZAK.

REFERENCES CITED

The following references are of record in the file of this patent:

UNITED STATES PATENTS

| Number | Name | Date |
|---|---|---|
| 781,151 | Murray | Jan. 30, 1905 |
| 1,769,571 | Groehn | July 1, 1930 |
| 2,155,594 | Hart | Apr. 25, 1939 |
| 2,352,165 | Buzza | June 27, 1944 |
| 2,355,072 | Honegger | Aug. 8, 1944 |
| 2,356,864 | Martin | Aug. 29, 1944 |
| 2,407,696 | Webster | Sept. 17, 1946 |

FOREIGN PATENTS

| Number | Country | Date |
|---|---|---|
| 19.842 | Norway | Aug. 25, 1909 |